(12) United States Patent
Hughes

(10) Patent No.: US 7,107,367 B1
(45) Date of Patent: Sep. 12, 2006

(54) METHOD FOR EFFICIENT BUFFER TAG ALLOCATION

(75) Inventor: William A. Hughes, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 382 days.

(21) Appl. No.: 10/639,128

(22) Filed: Aug. 12, 2003

(51) Int. Cl.
*G06F 3/00* (2006.01)
*G06F 13/00* (2006.01)

(52) U.S. Cl. .......................... 710/39; 711/170; 710/52; 710/56

(58) Field of Classification Search ........ 711/167–169, 711/170; 709/238; 710/220; 712/202; 718/102–107
See application file for complete search history.

(56) References Cited

U.S. PATENT DOCUMENTS

| | | | |
|---|---|---|---|
| 5,522,045 A * | 5/1996 | Sandberg .................... 709/215 |
| 5,524,263 A * | 6/1996 | Griffth et al. ................. 712/23 |
| 5,781,925 A * | 7/1998 | Larson et al. ............... 711/140 |
| 5,813,031 A * | 9/1998 | Chou et al. ................. 711/122 |
| 5,964,859 A * | 10/1999 | Steinbach et al. .......... 710/310 |
| 6,032,219 A * | 2/2000 | Robinson et al. .............. 711/1 |
| 6,230,191 B1 | 5/2001 | Walker |
| 6,446,183 B1 * | 9/2002 | Challenger et al. ......... 711/170 |
| 6,515,963 B1 | 2/2003 | Bechtolsheim et al. |
| 6,574,708 B1 * | 6/2003 | Hayter et al. ................ 711/118 |
| 6,574,725 B1 * | 6/2003 | Kranich et al. ................ 712/31 |
| 6,587,929 B1 * | 7/2003 | Henry et al. ................ 711/141 |
| 6,591,342 B1 * | 7/2003 | Akkary et al. .............. 711/125 |
| 2002/0188820 A1 * | 12/2002 | Taruki ........................ 711/218 |
| 2003/0046356 A1 * | 3/2003 | Alvarez et al. ............. 709/208 |
| 2003/0131043 A1 * | 7/2003 | Berg et al. .................. 709/104 |
| 2003/0182537 A1 * | 9/2003 | Le et al. ...................... 712/216 |
| 2003/0217238 A1 * | 11/2003 | Rowlands et al. .......... 711/154 |

* cited by examiner

*Primary Examiner*—Reginald G. Bragdon
*Assistant Examiner*—Thomas D. Vo
(74) *Attorney, Agent, or Firm*—Meyertons Hood Kivlin Kowert & Goetzel, P.C.; Rory D. Rankin

(57) ABSTRACT

A method and mechanism for allocating transaction tags. A request queue includes a counter whose value is used to identify a corresponding tag of a plurality of unique tags. The queue is configured to increment the counter and use the current count value to index into a buffer pool. If the tag corresponding to the currently indexed buffer pool entry is available for allocation, a determination is made as to whether the currently identified tag is corresponds to the last tag which has been de-allocated. If the identified available buffer pool entry/tag matches the last tag which was de-allocated, the queue continues the process of counter incrementation and searching of the buffer pool for an available entry to select for allocation. When a request is received, the currently selected tag is allocated. Additional circuitry may be used to identify a fallback tag in the event a request is received while the queue is searching for a tag. In such an event, the fallback tag may be allocated.

24 Claims, 6 Drawing Sheets

METHOD FOR EFFICIENT BUFFER TAG ALLOCATION

BACKGROUND OF THE INVENTION

1. Field of Invention

This invention relates to computer systems, and more particularly to resource tag allocation.

2. Description of Related Art

Typical computer systems include one or more sets of buses which serve as communication links between system components. Generally speaking, each bus has at least one component connected to it which can initiate a transaction. Such components are called "bus master" devices. Other devices coupled to the bus which are capable of responding to requests initiated by bus master devices are called "slave" devices. For example, a typical computer system includes a CPU coupled to a memory system via a bus. The CPU executes instructions stored in the memory system, and initiates transfers of instructions from the memory system as needed. The CPU also transfers data to the memory system for storage as required. The CPU is, by definition, a bus master device. The memory system simply responds to data transfer requests initiated by the CPU and is a slave device. A computer system including multiple CPUs or other components coupled to a common bus and capable of initiating transactions has multiple bus master devices. In such systems, each bus master device must compete with the other bus master devices for control of the bus when the bus is needed.

A typical computer system bus (i.e., system bus) includes multiple address, data, and control signal lines. Such system buses are typically divided into an address bus including the address signal lines, a data bus including the data signal lines, and a control bus including the control signal lines. Data transfers across the system bus are carried out using bus "transactions". A bus master device (e.g., the CPU) performs a "read" transaction in order to obtain needed data from another system component coupled to the system bus. During the read transaction, the bus master device transmits address signals upon the address bus and control signals indicative of a request for data (i.e., a read transaction) upon the control bus. Upon receiving the address and control signals, the target system component (e.g., the memory system) accesses the requested data. The target component then transmits data signals representing the requested data upon the data bus and control signals which indicate the availability of the data upon the control bus. In many computer systems, the bus master device maintains control of the system bus during the entire period of time between transmission of the address signals and reception of the requested data.

When performing a "write" transaction, the bus master device transmits address signals upon the address bus, data signals representing the data upon the data bus, and control signals indicating a transmission of data (i.e., a write transaction) upon the control bus. Upon receiving the address and control signals, the target system component (e.g., the memory system) stores the data signals. Following simultaneous transmission of address, data, and control signals during a write transaction, the bus master device typically assumes reception of the data by the target component and immediately relinquishes control of the system bus.

Where multiple bus master devices share a common system bus, it is often necessary to limit the amount of time that any one bus master device has control of the system bus. One method of limiting the amount of time a bus master device has control of the system bus is to utilize a split-transaction protocol wherein transactions are split into separate "address" and "data" portions or phases. A bus master device transmits the address and associated control signals during the address phase of a transaction. Following the address portion, the bus master device relinquishes control of the system bus, allowing other bus master devices to use the system bus while the target component is accessing the requested data. When the target component is ready to transmit the requested data, the target component transmits data signals representing the requested data and associated control signals during the data portion of the read transaction.

In a system employing a split transaction bus, each bus master typically generates a unique "tag" value which identifies the transaction. The tag value is transmitted along with information associated with the transaction (e.g., address or data signals), typically upon signal lines of the control bus. A bus master device initiating a read transaction may not retire the tag value until the data portion of the read transaction is completed (i.e., until the requested data is received from the target component). The tag received with the initial request is also included in the response in order to allow the response to be matched to the corresponding request.

Because each tag which is assigned by a requester must uniquely identify the corresponding transaction, a method for allocating and de-allocating unique tags is required. If a receiving device such as a memory controller has pending more than one request with a same tag, the receiving device must typically delay processing of the later received request until the ambiguity is resolved.

Various techniques have been used to allocate tags for transaction initiated by a requester. One technique involves the requester having a buffer with a fixed number of entries. Each entry of the buffer may, for example, be configured to store the address of an initiated transaction. Those entries which are currently storing a valid entry are marked as such, while those which are not storing a valid entry are marked as being available for allocation. When a request is received, the buffer may be searched from the bottom up until an available entry is found. The address corresponding to the available entry may then be used as a tag for the transaction. While this technique may be fairly straightforward, it may lead to tag re-circulation problems. For example, since the buffer may be searched in a particular order each time a request is received, those entries occurring earlier in the search order will be selected more often. Consequently, tags earlier in the search order will tend to be used more frequently—leading to an increased probability of multiple transactions with a same tag being outstanding.

Another technique used for allocating tags involves the use of free lists. In this method, tags which are available for allocation are maintained in a free list. Essentially, the free list acts as a FIFO with tags for a new request coming from one end while de-allocated tags are added to the other. However, such a technique may prove expensive given storage for all possible tags is required, as well as a structure to maintain the resulting FIFO.

Accordingly, an efficient method of allocating tags is desired.

SUMMARY OF THE INVENTION

A method and mechanism are contemplated wherein a request queue includes a counter and a buffer pool of tags for allocation. The counter includes a number of bits necessary to include a count value for each entry of the buffer pool. Generally speaking, the request queue is configured to increment the counter and use the current count value to index into the buffer pool. If the currently indexed buffer pool entry is available for allocation, the tag corresponding to the indexed entry is selected for allocation. In response to a request for a tag, the request queue may then allocate the currently selected tag. The request queue may further include an indication of the last buffer pool entry which has been de-allocated. During counter incrementation, indexing and searching of the buffer pool, if an identified available buffer pool entry matches the last buffer de-allocated, the identified entry is not selected and the request queue continues the process of counter incrementation and searching of the buffer pool for an available entry. Also contemplated is an embodiment wherein additional circuitry identifies a fallback tag. Subsequently, if the request queue receives a request for a new tag while it is currently searching for an available tag, the fallback tag may be immediately provided in response to the request.

BRIEF DESCRIPTION OF THE DRAWINGS

Other objects and advantages of the invention will become apparent upon reading the following detailed description and upon reference to the accompanying drawings in which.

Figure 1:
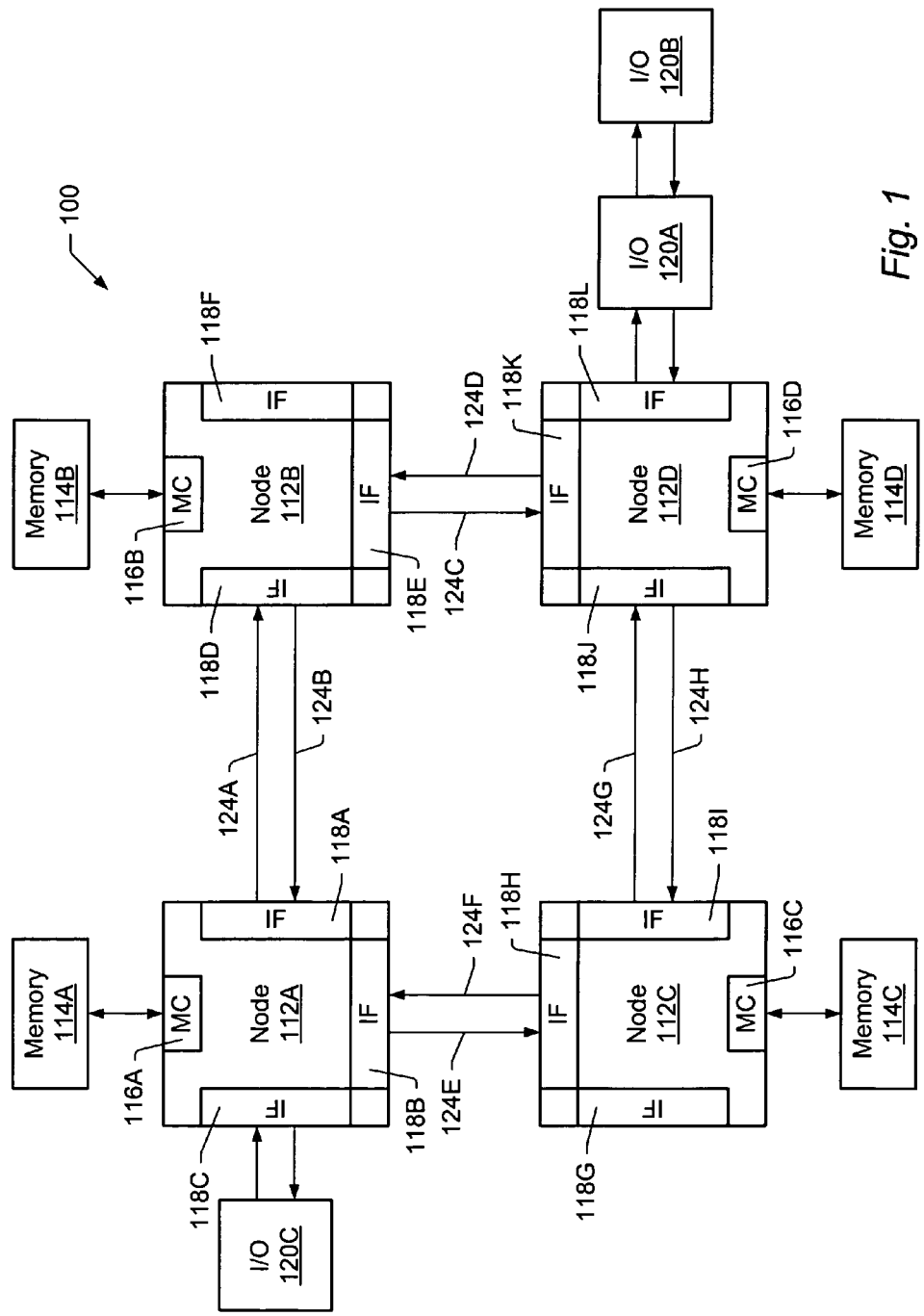
FIG. 1 is a block diagram of one embodiment of a computing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 illustrates one embodiment of a computing system 100. Other embodiments are possible and contemplated. In the embodiment of FIG. 1, computer system 100 includes processing nodes 112A, 112B, 112C, and 112D. Each processing node is coupled to a respective memory 114A–114D via a memory controller 116A–116D included within each respective processing node 112A–112D. Additionally, processing nodes 112A–112D include interface logic used to communicate between the processing nodes 112A–112D. For example, processing node 112A includes interface logic 118A for communicating with processing node 112B, interface logic 118B for communicating with processing node 112C, and a third interface logic 118C for communicating with an input/output (I/O) device 120C. Similarly, processing node 112B includes interface logic 118D, 118E, and 118F; processing node 112C includes interface logic 118G, 118H, and 118I; and processing node 112D includes interface logic 118J, 118K, and 118L. Processing node 112D is coupled to communicate with a plurality of I/O devices (e.g. devices 120A–120B in a daisy chain configuration) via interface logic 118L. Processing node 112A is coupled to communicate with I/O device 120C. Other processing nodes may communicate with other I/O devices in a similar fashion. Elements referred to herein with a particular reference number followed by a letter will be collectively referred to by the reference number alone. For example, nodes 112A–112D will be collectively referred to as nodes 112.

Processing nodes 112A–112D implement a packet-based link for inter-processing node communication. In the present embodiment, the link is implemented as sets of unidirectional lines (e.g. lines 124A are used to transmit packets from processing node 112A to processing node 112B and lines 124B are used to transmit packets from processing node 112B to processing node 112A). Other sets of lines 124C–124H are used to transmit packets between other processing nodes as illustrated in FIG. 1. Generally, each set of lines 124 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 112A to processing node 112D may pass through either processing node 112B or processing node 112C as shown in FIG. 1. Any suitable routing algorithm may be used. Other embodiments of computer system 100 may include more or fewer processing nodes then the embodiment shown in FIG. 1.

Processing nodes 112A–112D, in addition to a memory controller and interface logic, may include one or more processors. Broadly speaking, a processing node comprises at least one processor and may optionally include a memory controller for communicating with a memory and other logic as desired.

Memories 114A–114D may comprise any suitable memory devices. For example, a memory 114A–114D may comprise one or more RAMBUS DRAMs (RDRAMs), synchronous DRAMs (SDRAMs), static RAM, etc. The address space of computer system 100 is divided among memories 114A–114D. Each processing node 112A–112D may include a memory map used to determine which addresses are mapped to which memories 114A–114D, and hence to which processing node 112A–112D a memory request for a particular address should be routed. In one embodiment, the coherency point for an address within computer system 100 is the memory controller 116A–116D coupled to the memory storing bytes corresponding to the address. In other words, the memory controller 116A–116D is responsible for ensuring that each memory access to the corresponding memory 114A–114D occurs in a cache coherent fashion. Memory controllers 116A–116D may comprise control circuitry for interfacing to memories 114A–1 14D. Additionally, memory controllers 116A–116D may include request queues for queuing memory requests.

Generally, interface logic 118A–118L may comprise a variety of buffers for receiving packets from the link and for buffering packets to be transmitted upon the link. Computer system 100 may employ any suitable flow control mechanism for transmitting packets.

I/O devices 120A–120C may be any suitable I/O devices. For example, I/O devices 120 may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Figure 2:
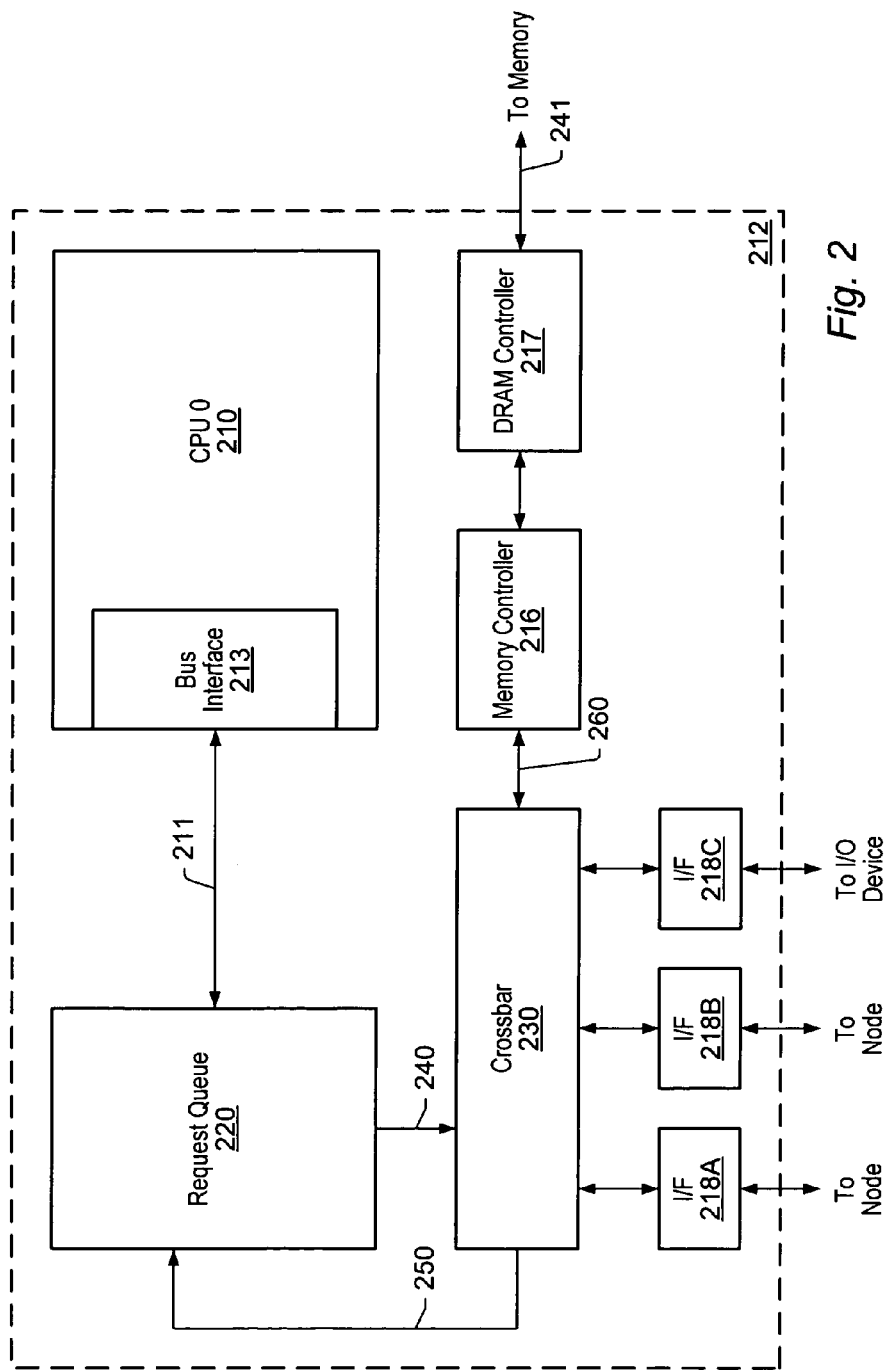
FIG. 2 is a block diagram of one embodiment of a processing node.

Turning now to FIG. 2, one embodiment of a node 212 which may be used in a system such as system 100 is shown. Node 212 illustrates a processing unit 210 including a bus interface BIU 213. Bus interface 213 is coupled to request queue 220 via bus 211. Request queue 220 is coupled to crossbar 230 via bus 240. Also coupled to crossbar 230 are interfaces 218A–218C. Crossbar 230 is coupled to request queue 220 via bus 250 and is further coupled to memory controller 216 via bus 260. Memory controller 216 is coupled to DRAM controller 217. While FIG. 2 illustrates node 212 as including a single processor 210 and multiple interfaces 218, it is to be understood that alternate configurations are possible and are contemplated. For example, node 212 may include multiple processors and a single external interface 218. Further, rather than DRAM controller 241, alternate configurations may include controllers configured to operate with memories other than DRAMs. For example, support for DDR SDRAM or RDRAM could be provided.

In the embodiment shown in FIG. 2, processor 210 is configured to convey memory requests to memory controller 216 via request queue 220. Crossbar 230 is configured to receive commands and/or data from request queue 220 and interfaces 218 and route accordingly. Because node 212 is configured to manage requests for access to a locally coupled memory from multiple requestors, request queue 220 may be configured to manage requests in such a way that access to memory is efficiently maintained for all requesters, while also preventing starvation.

Figure 3:
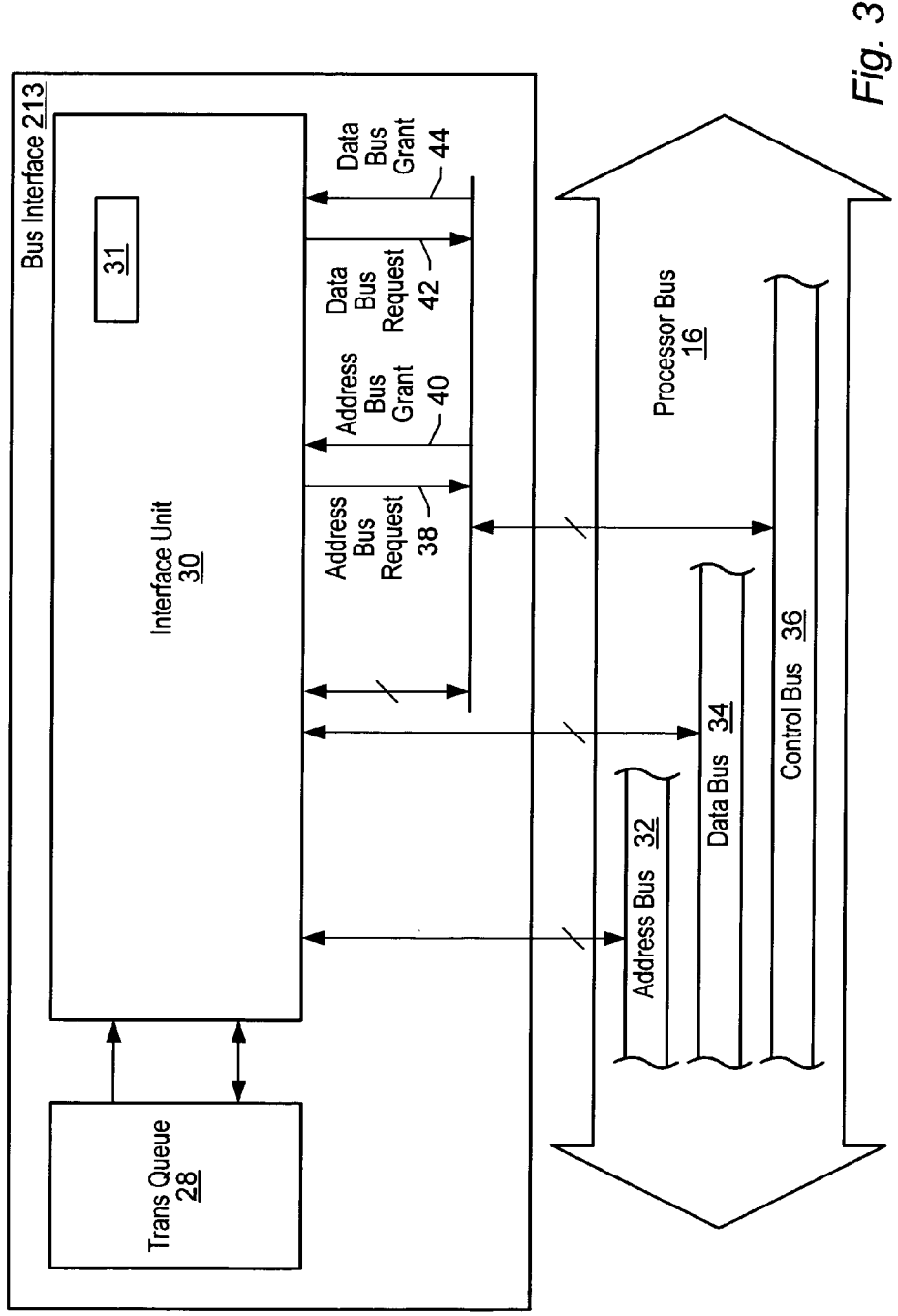
FIG. 3 illustrates one embodiment of bus interface.

FIG. 3 is a block diagram of one embodiment of bus interface 213. Bus interface 213 includes a transaction queue 28 coupled to an interface unit 30. Interface unit 30 is coupled to address bus 32, data bus 34, and control bus 36 of processor bus 16, and performs bus transactions (i.e., read and/or write transactions) upon processor bus 16. In one embodiment, bus 16 is configured as a "split transaction" bus. Generally speaking, a split transaction bus permits multiple transactions to be outstanding by splitting a read request into two parts such as an address phase and a data phase. A bus master device transmits the address and associated control signals during the address portion of a read transaction. Following the address portion, the bus master device relinquishes control of the system bus, allowing other bus master devices to use the system bus while the target component is accessing the requested data. When the target component is ready to transmit the requested data, the target component transmits data signals representing the requested data and associated control signals during the data portion of the read transaction. The split transaction bus may be configured to always return results in the same order they are requested (an "in-order" bus), or the bus may be configured to permit results to be returned out of order (an "out-of-order" bus). Numerous configurations are possible and are contemplated.

During the address portion of a read transaction initiated by bus interface 26 of a bus master device, the interface unit 30 of the bus interface 26: (i) generates a tag value which uniquely identifies the bus transaction, (ii) drives the tag value upon signal lines of control bus 36, and (iii) provides the tag value to the corresponding transaction queue 28. The bus interface 26 of the target component saves the tag value while accessing the requested data. During the data portion of the read transaction, the bus interface 26 of the target component drives the tag value upon signal lines of control bus 36, informing the bus interface 26 of the bus master device that the requested data is being provided.

In one embodiment, transaction queue 28 includes a number of storage locations for storing tag values of outstanding (i.e., incomplete) bus transactions. Transaction queue 28 removes the tag value associated with an outstanding transaction from the transaction queue (i.e., retires the tag value) when the corresponding bus transaction is completed. In the case of a write transaction initiated by the interface unit 30 of a bus interface 26, the corresponding transaction queue 28 may retire the associated tag value immediately after interface unit 30 drives the associated address, data, and control signals upon the signal lines of processor bus 16. In the case of a read transaction initiated by the interface unit 30 of a bus interface 26, the corresponding transaction queue 28 may retain the tag value until the data portion is completed (i.e., until the requested data is received from the target component during the data portion of the read transaction).

In one embodiment, bus interface 213, or the master which corresponds to bus interface 213, includes an indication 31 as to how many requests the master may have pending at any one time. For example, request 220 may include a limited number of entries. Accordingly, at system reset, or another configuration event, each master in the system which may convey requests to request queue 220 may be allotted a certain number of requests they may issue. When a master issues a requests, the master decrements the number of requests which it is permitted to issue. When a transaction corresponding to a request is completed, the corresponding master may then increment the number of requests which it may issue. Request queue 220 may be configured to dynamically allot additional permitted requests to any master when the queue 220 has entries available. In this manner, the total number of pending requests may be controlled and request queue 220 will not receive a request when the queue 220 has no entries available.

Each bus interface 26 may further be connected to a bus arbiter (not shown) by an "address bus request" signal line 38, an "address bus grant" signal line 40, a "data bus request" signal line 42, and a "data bus grant" signal line 44 of control bus 36. During a bus transaction, the bus interface 26 of a device coupled to processor bus 16 competes with other bus master devices for control of address bus 32 and/or data bus 34. In order to gain control of address bus 32, the interface unit 30 of a bus interface 26 may assert an "address bus request" signal upon the dedicated address bus request signal line 38. The address bus request signal is received by the bus arbiter. In response to the address bus request signal, the bus arbiter awards control of address bus 32 to the bus interface 26 by asserting an "address bus grant" signal upon the dedicated address bus grant signal line 40. Upon receiving the address bus grant signal, the bus interface 26 assumes control of address bus 32.

In order to gain control of data bus 34, the interface unit 30 of a bus interface 26 asserts a "data bus request" signal upon the dedicated data bus request signal line 42. The data bus request signal is received by the bus arbiter. In response to the data bus request signal, the bus arbiter awards control of data bus 34 to the bus interface 26 by asserting a "data bus grant" signal upon the dedicated data bus grant signal line 44. Upon receiving the data bus grant signal, the bus interface 26 assumes control of data bus 34. It is noted that other methods of bus arbitration may be employed as well.

Figure 4:
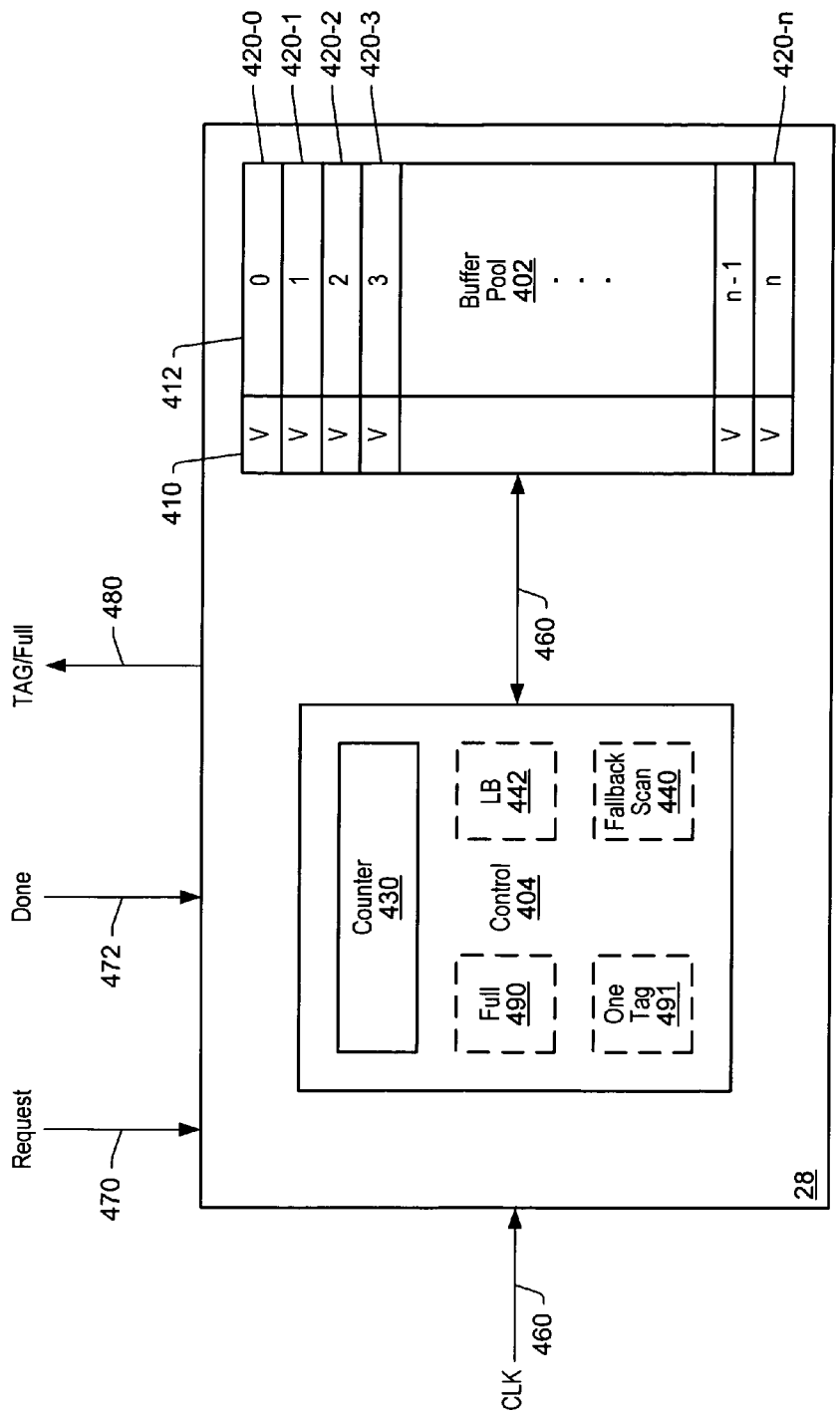
FIG. 4 is a block diagram of one embodiment of a request queue.

FIG. 4 illustrates one embodiment of the request queue 220 shown in FIG. 2. In the embodiment of FIG. 4, request queue 220 is coupled to receive a clock signal (CLK) 460, request signal 470, and done signal 472. Request queue 220 is further configured to convey either a tag and/or optionally a full indication 480 to interface unit 30. Request queue 220 includes a control unit 404 and a buffer pool 402. Buffer pool 402 includes a plurality of entries 420-1 to 420-n, each including a valid bit 410 and a unique address or tag 412. While each entry 420 may actually store a unique tag, this need not be the case. Rather, the address by which each entry 420 is addressed may serve as a unique tag and the contents of each entry may simply include a valid bit 410, or other indication that the corresponding tag has been allocated. Therefore, the entries shown 0-n may represent the address of the corresponding entry rather than a contents of the entry.

Control unit 404 includes a counter 430 which includes as many bits as necessary to address the number of entries included in the buffer pool 402. For example, if buffer pool 402 includes 32 entries, the counter 430 must include at least five bits. In general, if buffer pool 402 includes n entries, then the number of bits x needed for counter 430 may be represented $$\left\lceil \frac{\ln n}{\ln 2} \right\rceil,$$

where the function $\rceil y \lceil$ is the "ceiling function" giving the smallest integer $\geq y$. In one embodiment, counter 430 is configured as a "wrap around" counter wherein it starts over at zero once its maximum value has been reached. Accordingly, buffer pool 402 may be indexed as a circular buffer.

Generally speaking, control unit 404 is configured to increment counter 430 as described below and use the counter value as an index into buffer pool 402. The buffer pool entry 420 which is currently addressed, or indexed, by the counter 430 is checked for availability. In the embodiment shown, a valid bit 410 may be used to indicate whether or not an entry has already been allocated. Other methods of indicating the allocation or de-allocation of an entry may be utilized as well. If the entry which is currently indexed by the counter is available for allocation, control unit 404 disables the incrementing of counter 430. Subsequently, when a request 470 is detected, control unit marks the currently indexed entry as allocated (e.g., by setting/resetting the valid bit 410) and request queue 220 conveys the tag corresponding to the currently indexed entry via bus 480. Control unit 404 may then resume incrementing counter 430 and searching buffer pool 402 for an available entry.

Control unit 404 may be further configured to detect if all entries of buffer pool 402 have been allocated, a condition which may be referred to as "full". When buffer pool 402 is detected to be full, control unit 404 may store an indication 490 of this condition. As noted above, each master may be allotted a limited number of requests and keep track of requests which it has issued. Consequently, a master will not issue requests when they have none available to issue and the request queue 220 does not receive requests when it is full. However, in an alternative embodiment, if a request 470 is received when the buffer pool 402 is full, request queue 28 may convey a full indication rather than a tag via bus 480. In one embodiment, full indication 490 may comprise a counter which is incremented each time an entry 420 is allocated, and decremented each time an entry 420 is deallocated. If the full counter 490 equals the number of entries in the buffer pool 402, then a full condition is detected. In one embodiment, control unit 404 is configured to disable counter 430, and possibly other circuitry, while a full condition is detected. In a further embodiment, discussed below, control unit 404 may be configured to detect, or include an indication 491, that only one entry is available in the buffer pool 402.

In addition to the above, request queue 220 is configured to receive an indication 472 that a transaction has completed, or is done. For example, read data corresponding to a read transaction may have been received by bus interface 213. Done signal 472 includes an indication of the tag, originally provided by request queue 28, which corresponds to the completed transaction. In response to receiving the done signal 472, control unit 404 is configured to de-allocate the buffer pool entry 420 corresponding to the received tag. In the embodiment shown, de-allocation may simply comprise setting or re-setting the valid bit 410 as appropriate, thereby making the entry/tag available for allocation.

In one embodiment, control unit 404 includes fallback scan circuit 440 and a last buffer/tag de-allocated (LB) indication 442. In such an embodiment, when an entry is de-allocated (made available) by control unit 404, control unit 404 is further configured to store an indication of the entry/tag which was de-allocated in the location designated LB indication 442. Subsequently, while incrementing counter 430 and indexing into buffer pool 402, buffer pool entries 420 which are detected to be available are compared to the entry/tag value stored in LB indication 442. If the detected available entry 420 matches the last entry which was de-allocated (LB indication 442), the control unit 404 is configured to continue incrementing counter 430 and searching buffer pool 402 for an available entry. In this manner, the last buffer de-allocated is disfavored for immediate re-allocation and the probability of re-allocating a recently de-allocated tag is minimized.

Fallback circuit 440 is configured to identify an available buffer pool entry in the event counter 430 has not identified an entry when a request is received. In one embodiment, fallback circuit 440 is configured to operate concurrently with the operation of counter 430. As already described above, counter 430 may search for an available buffer pool entry 420 in preparation for a next received request. This search for an entry 420 may include disfavoring a last entry de-allocated as described. However, it is possible for one or more requests to be received by queue 220 prior to control circuit 404 identifying an available entry 420 with counter 430. In addition, even if counter 430 has identified an available entry, it is possible that more than one request may be concurrently received. In such an event, only one of the received requests may be allocated the entry identified by circuit 430 while the other request is allocated an entry identified by fallback circuit 440.

In one embodiment, fallback circuit 440 comprises one or more levels of combinational logic coupled to valid bits 410. Circuit 440 is configured to identify entries 420 which are available. In one embodiment, circuit 440 is configured to scan entries 420 from the top entry 420-0 to the bottom entry 420-n. The first entry 420 identified as available, starting from the top, is selected as the "fallback" entry. This fallback entry is then allocated for a request in the event that counter 430 has not identified an available entry. In yet another embodiment, fallback circuit 440 may be configured to search entries 420 from the bottom 420-*n* to the top 420-0 while concurrently searching the entries 420 from top to bottom as described above. Such an embodiment may be desirable if, for example, queue 28 is configured to receive more than one request concurrently via two or more ports.

As mentioned above, in a further embodiment, if the detected available entry 420 matches the last entry which was de-allocated, the control unit 404 may be configured to determine whether this entry is the only entry currently available. If the entry is the only entry currently available, control unit 404 may stop incrementing the counter 430 and searching for a further entry. Subsequently, when an additional entry is de-allocated, control unit 404 may resume the incrementing/searching process. Alternatively, when an entry is subsequently de-allocated, control unit 404 may be configured to detect that it currently (prior to the de-allocation) has only one entry available. In such a case, rather than immediately resuming the counter/search process, control unit 404 may be configured to directly set the counter 430 to the value indicated by fallback scan circuit 440 and store the newly de-allocated entry/tag as the new fallback tag. A subsequently de-allocated entry/tag may then result in the control unit 404 resuming the counter/search process.

If a request 470 then arrives while control unit 402 is searching for an available entry 420, control unit 402 is configured to provide the tag which is indicated by fallback circuit 440 via bus 480. In one embodiment, when providing the tag indicated by fallback circuit 440, control unit 404 is configured to utilize the indicated tag to directly address the entry 420 in buffer pool 402 which corresponds to the fallback tag and store an indication that the entry has been allocated.

It is noted that in certain embodiments buffer pool entries 420 may be addressed in increments of one and the value of counter 430 may be directly used to index into buffer pool 402. However, in alternative embodiments, buffer pool entries 420 may be addressed in increments other than one. In such embodiment, control unit may be configured to multiply the value of counter 430 as appropriate in order to index into buffer pool 402.

Figure 5:
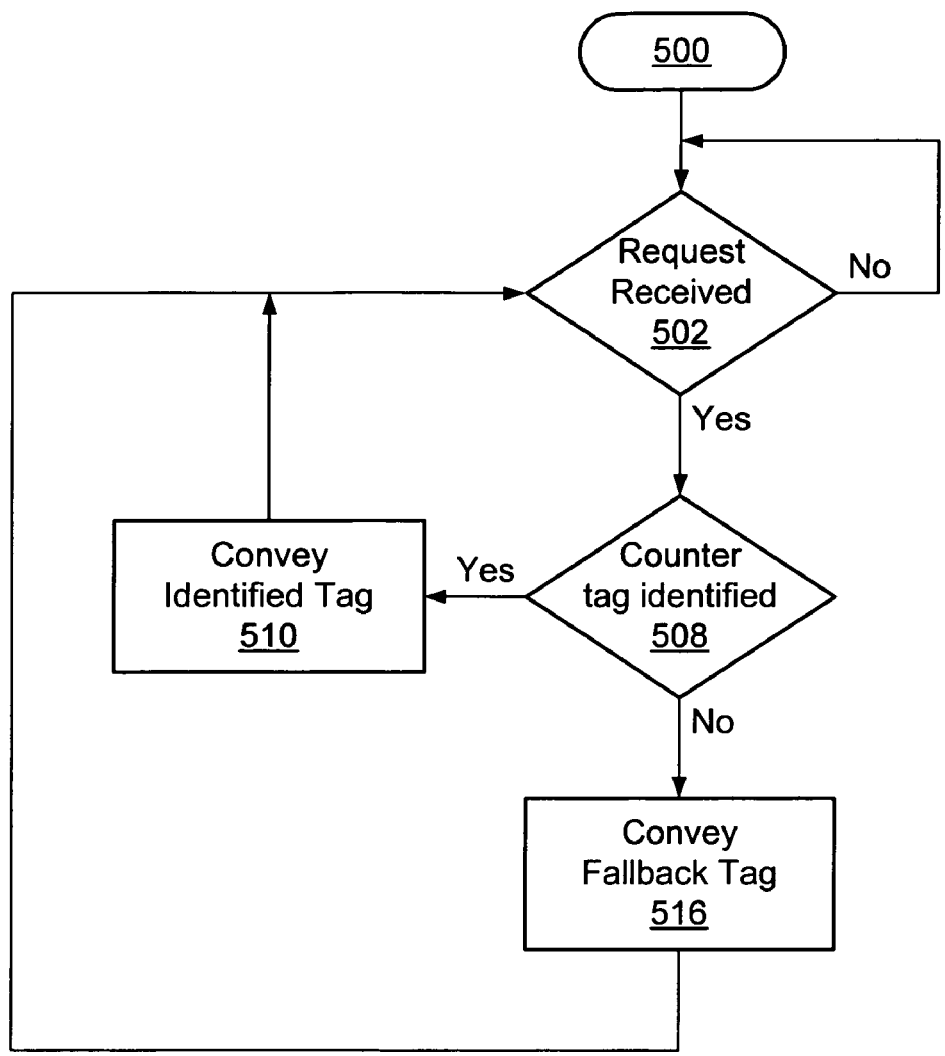
FIG. 5 illustrates one embodiment of a method corresponding to the queue of FIG. 4.

FIG. 5 illustrates one embodiment of a method in accordance with the foregoing description. FIG. 5 includes an entry point 500. In response to detecting a received request (decision block 502), a determination is made as to whether or not counter 430 mechanism has already identified an entry and corresponding tag for allocation (decision block 508). If the counter mechanism has identified an available entry, the identified tag is conveyed (block 510). Alternatively, if no entry/tag is currently identified via the counter mechanism (i.e., the counter is searching for an entry), a fallback tag is conveyed (block 516) in response to the request.

Figure 6:
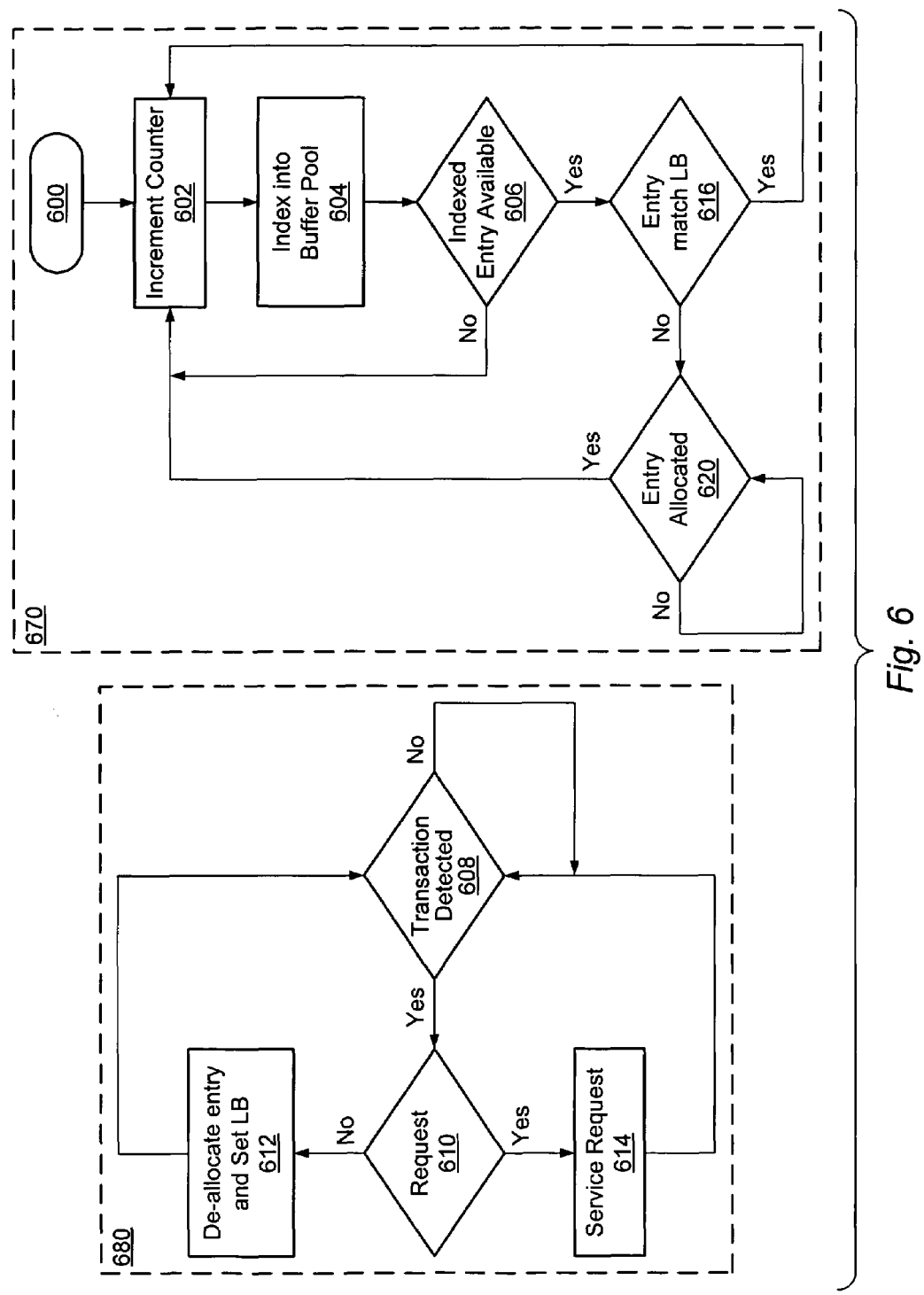
FIG. 6 illustrates one embodiment of a method corresponding to the queue of FIG. 4.

FIG. 6 illustrates a further method in accordance with the foregoing description. FIG. 6 shows two processes, 670 and 680, which may generally be seen to operate concurrently. Processing block 670 generally corresponds to the operation of counter circuit 430. For the purposes of discussion, FIG. 6 includes an entry point 600. Entry point 600 assumes an entry/tag has not yet been selected by counter mechanism 430. If entries are available for allocation, the request queue is configured to increment a counter (block 602) and index into a buffer (block 604). In one embodiment, if the currently indexed buffer pool entry is not available (decision block 606), the method returns to block 602 and continues incrementation.

Returning to decision block 606, if the currently indexed entry is detected to be available, a determination is made as to whether the currently indexed entry matches the last buffer entry de-allocated (LB) (decision block 616). If the currently indexed entry is available and does not match the last buffer de-allocated, the entry currently indexed by the counter is selected as the next entry to be allocated and a wait state 620 is entered until the currently indexed entry is allocated. Once the currently indexed entry is allocated 620, the counter is again incremented 602. On the other hand, if the currently indexed available entry matches the currently stored LB (decision block 616), processing returns to decision block 602. In one embodiment, if the counter mechanism identifies and rejects an available entry because it matches the last entry de-allocated (decision block 616), that entry may serve as an alternate fallback tag. This alternate fallback tag could be used, for example, in the event a request is received and the counter mechanism has not identified an available entry.

Processing block 680 illustrates the processing of received transactions. Wait state 608 waits for a transaction requiring processing. In the event a transaction is detected (decision block 608), a determination is made (decision block 610) as to whether the detected transaction is a request for a tag or an indication that a previous transaction has completed. If the detected transaction is a request for a new tag, the request is serviced (block 614) by providing a new tag as described above. If, on the other hand, the detected transaction indicates completion of an earlier transaction, the tag/entry corresponding to the detected transaction is de-allocated and an indication of this de-allocated tag/entry is stored as a last buffer de-allocated (LB) (block 612).

In the embodiment of FIG. 6, it is noted that the counter is generally not reset prior to beginning a search for an available entry. Rather, the counter continues from the point at which it previously stopped. In this manner, the likelihood of tags being allocated in an uneven manner may be reduced. In addition, by disfavoring the last buffer de-allocated, the likelihood of uneven allocation is further reduced. Of course, if desired the counter may be reset on system start-up or at other times deemed appropriate.

As already described above, a transaction may be received prior to the counter mechanism identifying an entry/tag for allocation. Consequently, wait state 608 may be viewed as being active concurrently with blocks 602, 604, 606, 616, and 620 which generally correspond to the identification and selection of an entry/tag by the counter mechanism. In one embodiment, reception (decision block 610) and servicing (decision block 614) of a request may generally correspond to the embodiment illustrated by FIG. 5.

Numerous variations and modifications will become apparent to those skilled in the art once the above disclosure is fully appreciated. For example, while the request queue has been described in the context of a bus master in a processing unit, the method and mechanism described herein may be utilized in any context wherein the allocation of tags may be required. It is intended that the following claims be interpreted to embrace all such variations and modifications.

What is claimed is:

1. A method for allocating a tag, said method comprising:
   incrementing a counter responsive to determining a tag of a plurality of unique tags has not been selected for allocation;

utilizing a value of said counter to identify a first tag of said tags;

determining whether said first tag is available for allocation;

repeating said incrementing, utilizing, and determining if said first tag is not available for allocation; and selecting said first tag for allocation if said first tag is available for allocation and said first tag does not correspond to a tag most recently de-allocated.

2. The method as recited in claim 1, wherein said method further comprises selecting said first tag for allocation in response to detecting said first tag is available for allocation, said first tag corresponds to a tag most recently de-allocated, and said first tag is an only tag of said tags available for allocation.

3. The method as recited in claim 1, further comprising repeating said incrementing, utilizing, and determining in response to detecting said first tag is available for allocation, said first tag corresponds to a tag most recently de-allocated, and said first tag is not an only tag of said tags available for allocation.

4. The method as recited in claim 3, further comprising storing said first tag as a fallback tag in response to detecting said first tag is available for allocation, said first tag corresponds to a tag most recently de-allocated, and said first tag is not an only tag of said tags available for allocation.

5. The method as recited in claim 1, further comprising determining a fallback tag concurrently with said incrementing, utilizing, and determining.

6. The method as recited in claim 1, further comprising:
detecting a received transaction; and
allocating a tag for said transaction in response to determining said transaction corresponds to a request.

7. The method as recited in claim 6, wherein said tag allocated for said request corresponds to said first tag.

8. The method as recited in claim 7, wherein in response to detecting a tag has not been selected for allocation, said tag allocated for said request corresponds to a fallback tag.

9. The method as recited in claim 6, wherein in response to detecting said transaction corresponds to a completion indication, said method further comprises:
de-allocating a tag which corresponds to the received transaction; and
storing an indication that said de-allocated tag is a tag most recently de-allocated.

10. A request queue comprising:
a buffer pool including a plurality of entries, each said entry being indicative of a unique tag; and
a control unit, wherein said control unit is configured to:
increment a counter responsive to determining no tag of said entries has been selected for allocation;
utilize a value of said counter to identify a first entry of said entries;
determine whether a first tag corresponding to said first entry is available for allocation;
repeat said incrementing, utilizing, and determining in response to detecting said first tag is not available for allocation; and
select said first tag for allocation in response to detecting said first tag is available for allocation and said first tag does not correspond to a tag most recently de-allocated.

11. The queue as recited in claim 10, wherein said control unit is further configured to select said first tag for allocation in response to detecting said first tag is available for allocation, said first tag corresponds to a tag most recently de-allocated, and said first tag is an only tag of said tags available for allocation.

12. The queue as recited in claim 10, wherein said control unit is further configured to repeat said incrementing, utilizing, and determining in response to detecting said first tag is available for allocation, said first tag corresponds to a tag most recently de-allocated, and said first tag is not an only tag corresponding to said entries which is available for allocation.

13. The queue as recited in claim 12, wherein said control unit is further configured to store said first tag as a fallback tag in response to detecting said first tag is available for allocation, said first tag corresponds to a tag most recently de-allocated, and said first tag is not an only tag of said tags available for allocation.

14. The queue recited in claim 10, wherein said control unit is further configured to determine a fallback tag concurrently with said incrementing, utilizing, and determining.

15. The queue as recited in claim 10, wherein said control unit is further configured to:
detect a received transaction; and
allocate a tag for said transaction in response to determining said transaction corresponds to a request.

16. The queue as recited in claim 15, wherein said tag allocated for said request corresponds to said first tag.

17. The queue as recited in claim 16, wherein in response to detecting a tag has not been selected for allocation, said tag allocated for said request corresponds to a fallback tag.

18. The queue as recited in claim 15, wherein in response to detecting said transaction corresponds to a completion indication, said control unit is further configured to:
de-allocate a tag which corresponds to the received transaction; and
store an indication that said de-allocated tag is a tag most recently de-allocated.

19. The queue as recited in claim 10, wherein said queue is coupled to receive requests from one or more bus mastering devices.

20. A system comprising:
a bus master including a bus interface coupled to a bus; and
a request queue coupled to said bus master via said bus;
wherein said request queue is configured to:
increment a counter responsive to determining no tag of said entries has been selected for allocation;
utilize a value of said counter to identify a first entry of said entries;
determine whether a first tag corresponding to said first entry is available for allocation;
repeat said incrementing, utilizing, and determining in response to detecting said first tag is not available for allocation; and
select said first tag for allocation in response to detecting said first tag is available for allocation and said first tag does not correspond to a tag most recently de-allocated.

21. The system as recited in claim 20, wherein said queue is further configured to select said first tag for allocation in response to detecting said first tag is available for allocation, said first tag corresponds to a tag most recently de-allocated, and said first tag is an only tag of said tags available for allocation.

22. The system as recited in claim 20, wherein said queue is further configured to repeat said incrementing, utilizing, and determining in response to detecting said first tag is available for allocation, said first tag corresponds to a tag most recently de-allocated, and said first tag is not an only tag corresponding to said entries which is available for allocation.

23. The system as recited in claim 22, wherein said queue is further configured to store said first tag as a fallback tag in response to detecting said first tag is available for allocation, said first tag corresponds to a tag most recently de-allocated, and said first tag is not an only tag of said tags available for allocation.

24. The system as recited in claim 20, wherein said queue is further configured to:

detect a received transaction; and allocate a tag for said transaction in response to determining said transaction corresponds to a request.

* * * * *